(12) United States Patent
Kakura

(10) Patent No.: US 10,148,395 B2
(45) Date of Patent: Dec. 4, 2018

(54) RADIO COMMUNICATION SYSTEM, CONTROL DEVICE, BASE STATION, INFORMATION TRANSMITTING METHOD, AND INFORMATION RECEIVING METHOD

(71) Applicant: NEC Corporation, Tokyo (JP)

(72) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/501,666

(22) PCT Filed: Apr. 28, 2015

(86) PCT No.: PCT/JP2015/002283
§ 371 (c)(1),
(2) Date: Feb. 3, 2017

(87) PCT Pub. No.: WO2016/021093
PCT Pub. Date: Feb. 11, 2016

(65) Prior Publication Data
US 2017/0230151 A1 Aug. 10, 2017

(30) Foreign Application Priority Data
Aug. 7, 2014 (JP) ................................ 2014-161351

(51) Int. Cl.
*H04L 5/00* (2006.01)
*H04W 16/32* (2009.01)
(Continued)

(52) U.S. Cl.
CPC ........... *H04L 5/0032* (2013.01); *H04W 16/32* (2013.01); *H04W 28/16* (2013.01); *H04W 52/02* (2013.01);
(Continued)

(58) Field of Classification Search
CPC ............. H04W 28/16; H04W 52/0206; H04W 76/046; H04W 92/20
See application file for complete search history.

(56) References Cited

U.S. PATENT DOCUMENTS 9,888,447 B2 * 2/2018 Fujishiro ............. H04W 52/346
2003/0186705 A1 * 10/2003 Lahav ................... H04W 16/06
455/451
(Continued)

FOREIGN PATENT DOCUMENTS

EP 2219302 A1 8/2010
JP 2013-534107 A 8/2013

OTHER PUBLICATIONS

Masahiro Uno et al., "Sensing and Fairness Control of Dynamic Spectrum Access for System ISM Band", Proceedings of the 2011 IEICE General Conference, Tsushin 1, Feb. 8, 2011 (3 pages).
(Continued)

*Primary Examiner* — Janice N Tieu
(74) *Attorney, Agent, or Firm* — Wilmer Cutler Pickering Hale and Dorr LLP

(57) ABSTRACT

A radio communication system according to the present invention includes a base station (10) configured to start or stop a data transmission process according to presence/absence of a terminal with which the base station (10) communicates, a base station (20) whose communication area includes a place where a terminal (40) is present, the terminal (40) being affected by interference when the data transmission process is performed in the base station (10), and a control device (30) configured to control a start timing of the data transmission process in the base station (10) and transmit information about the start timing of the data transmission process in the base station (10) to the base station (20).

10 Claims, 9 Drawing Sheets

(51) Int. Cl.
    *H04W 28/16*     (2009.01)
    *H04W 52/02*     (2009.01)
    *H04W 92/20*     (2009.01)
    *H04W 76/27*     (2018.01)
    *H04W 52/24*     (2009.01)

(52) U.S. Cl.
    CPC ..... *H04W 52/0206* (2013.01); *H04W 52/244* (2013.01); *H04W 76/27* (2018.02); *H04W 92/20* (2013.01); *Y02D 70/00* (2018.01)

(56) References Cited

U.S. PATENT DOCUMENTS

| | | | |
|---|---|---|---|
| 2007/0218948 A1* | 9/2007 | Kurokawa | H04W 56/0015 455/560 |
| 2010/0130245 A1* | 5/2010 | Iseda | H04L 1/0001 455/522 |
| 2012/0099448 A1 | 4/2012 | Matsuo et al. | |
| 2013/0122913 A1 | 5/2013 | Agarwal et al. | |

OTHER PUBLICATIONS

3 GPP TR36.872 v12.1.0, (Dec. 2013); 3rd Generation Partnership Project; Technical Specification Group Radio Access Network; Small cell enhancements for E-UTRA and E-UTRAN—Physical layer aspects (Release 12) (100 pages).
International Search Report corresponding to International Patent Application PCT/JP2015/002283 dated Jul. 21, 2015 (3 total pages).
Extended European Search Report issued in European Patent Application No. 15830041.8, dated Jan. 4, 2018, 8 pages.

\* cited by examiner

| CQI index | MODULATION METHOD | ENCODING RATE | INFORMATION BIT/SYMBOL |
|---|---|---|---|
| 0 | out of range | | |
| 1 | QPSK | 0.076 | 0.1523 |
| 2 | QPSK | 0.12 | 0.2344 |
| 3 | QPSK | 0.19 | 0.3770 |
| 4 | QPSK | 0.3 | 0.6016 |
| 5 | QPSK | 0.44 | 0.8770 |
| 6 | QPSK | 0.59 | 1.1758 |
| 7 | 16QAM | 0.37 | 1.4766 |
| 8 | 16QAM | 0.48 | 1.9141 |
| 9 | 16QAM | 0.6 | 2.4063 |
| 10 | 64QAM | 0.45 | 2.7305 |
| 11 | 64QAM | 0.55 | 3.3223 |
| 12 | 64QAM | 0.65 | 3.9023 |
| 13 | 64QAM | 0.75 | 4.5234 |
| 14 | 64QAM | 0.85 | 5.1152 |
| 13 | 64QAM | 0.93 | 5.5547 |

Fig. 4

RADIO COMMUNICATION SYSTEM, CONTROL DEVICE, BASE STATION, INFORMATION TRANSMITTING METHOD, AND INFORMATION RECEIVING METHOD

CROSS REFERENCE TO RELATED APPLICATIONS

This application is a national stage application of International Application No. PCT/JP2015/002283 entitled "RADIO COMMUNICATION SYSTEM, CONTROL DEVICE, BASE STATION, INFORMATION TRANSMITTING METHOD, AND INFORMATION RECEIVING METHOD", filed on Apr. 28, 2015, which claims the benefit of the priority of Japanese Patent Application No. 2014-161351, filed on Aug. 7, 2014, the disclosures of each of which are hereby incorporated by reference in their entirety.

TECHNICAL FIELD

The present invention relates to a radio communication system, and in particular to a radio communication system including a plurality of base stations.

BACKGROUND ART

In the field of mobile communication systems, it has been studied to arrange cells having relatively small coverage in a high density in order to accommodate rapidly-increasing mobile data traffic. When coverage is reduced to the order of several meters or several tens of meters, the number of users that can be present in one cell is limited. Since the distribution of mobile date traffic changes every moment, there could be a brief moment during which there is a cell where no user performing communication is present. In such a situation, it is desirable that the base station instantly stop the output of radio waves in the cell where no user performing communication is present in order to prevent interference to other cells or reduce the power consumption. Further, when a user present in the cell performs communication, the base station needs to restart the output of radio waves in the cell where the output of radio waves have been stopped.

Non-patent Literature 1 discloses a process for turning on or off the output of radio waves in a small cell according to a change in mobile data traffic in the order of several msec to several hundred msec in the 3GPP (3rd Generation Partnership Project).

CITATION LIST

Non Patent Literature

Non-patent Literature 1: 3GPP TR36.872 v12.1.0 3rd Generation Partnership Project; Technical Specification Group Radio Access Network; Small cell enhancements for E-UTRA and E-UTRAN-Physical layer aspects (Release 12)

SUMMARY OF INVENTION

Technical Problem

As disclosed in Non-patent Literature 1, when the output of radio waves is started in the small cell where the output of radio waves have been stopped, interference with cells adjacent to that small cell sharply increases. However, since the cells adjacent to the small cell cannot recognize the timing at which the output of radio waves is turned on/off in the small cell, they cannot cope with the sharp increase in the interference. Therefore, there is a risk that communication quality could significantly deteriorate in the cells adjacent to the small cell.

An object of the present invention is to provide a radio communication system, a control device, a base station, an information transmitting method, and an information receiving method capable of, when the output of a radio wave is started in a given cell, enabling a cell adjacent to the given cell to cope with a sharp increase in interference and thereby prevent the deterioration of communication quality.

Solution to Problem

A radio communication system according to a first aspect of the present invention includes: a first base station configured to start or stop a data transmission process according to presence/absence of a terminal with which the first base station communicates; a second base station whose communication area includes a place where a terminal is present, the terminal being affected by interference when the data transmission process is performed in the first base station; and a control device configured to control a start timing of the data transmission process in the first base station and transmit information about the start timing of the data transmission process in the first base station to the second base station.

A control device according to a second aspect of the present invention is a control device configured to control a first base station configured to start or stop a data transmission process according to presence/absence of a terminal with which the first base station communicates, and a second base station whose communication area includes a place where a terminal is present, the terminal being affected by interference when the data transmission process is performed in the first base station, in which the control device includes a communication unit configured to control a start timing of the data transmission process in the first base station and transmit information about the start timing of the data transmission process in the first base station to the second base station.

A base station according to a third aspect of the present invention is a base station whose communication area includes a place where a terminal is present, the terminal being affected by interference when a data transmission process is performed in a first base station, the first base station being configured to start or stop the data transmission process according to presence/absence of a terminal with which the first base station communicates, in which the base station includes a communication quality estimation unit configured to control a start timing of the data transmission process in the first base station and receive information about the start timing of the data transmission process in the first base station.

An information transmitting method according to a fourth aspect of the present invention is an information transmitting method performed in a control device, the control device being configured to control a first base station configured to start or stop a data transmission process according to presence/absence of a terminal with which the first base station communicates, and a second base station whose communication area includes a place where a terminal is present, the terminal being affected by interference when the data transmission process is performed in the first base station, in which the information transmitting method includes controlling a start timing of the data transmission process in the first base station, and transmitting information about the start timing of the data transmission process in the first base station to the second base station.

An information receiving method according to a fifth aspect of the present invention is an information receiving method performed in a base station whose communication area includes a place where a terminal is present, the terminal being affected by interference when a data transmission process is performed in a first base station, the first base station being configured to start or stop the data transmission process according to presence/absence of a terminal with which the first base station communicates, in which the information receiving method includes controlling a start timing of the data transmission process in the first base station, and receiving information about the start timing of the data transmission process in the first base station.

Advantageous Effects of Invention

According to the present invention, it is possible to provide a radio communication system, a control device, a base station, an information transmitting method, and an information receiving method capable of, when the output of a radio wave is started in a given cell, enabling a cell adjacent to the given cell to cope with a sharp increase in interference and thereby prevent the deterioration of communication quality.

BRIEF DESCRIPTION OF DRAWINGS

FIG. 4 is a table for explaining transmission parameters according to the second exemplary embodiment.

DESCRIPTION OF EMBODIMENTS

First Exemplary Embodiment

Figure 1:
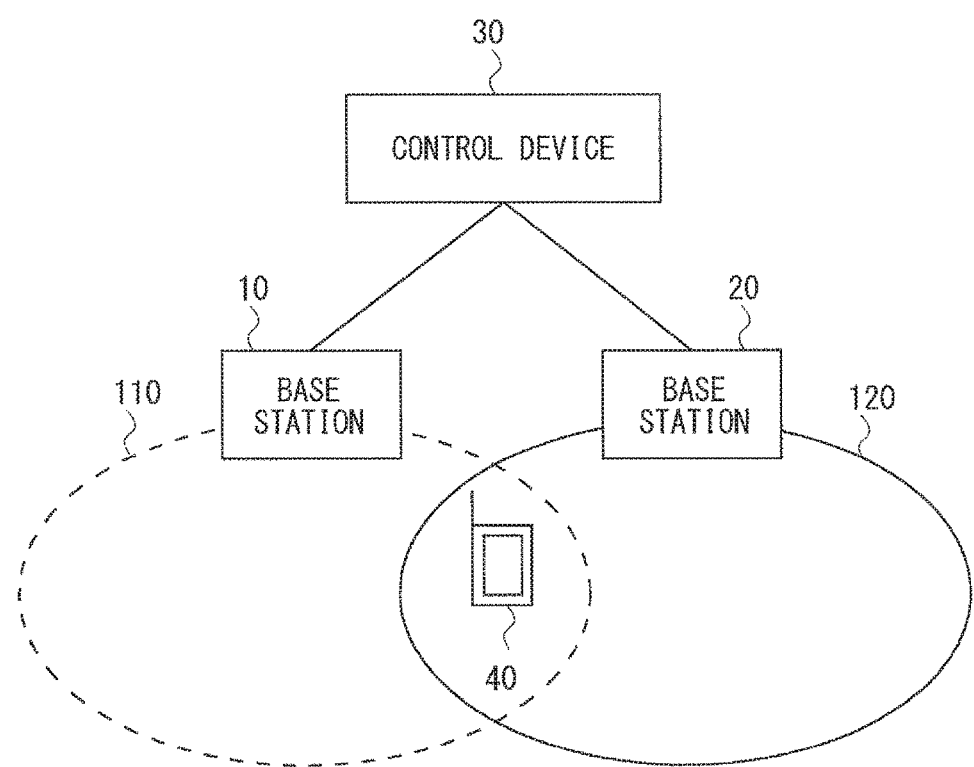
FIG. 1 is a configuration diagram of a radio communication system according to a first exemplary embodiment.

Exemplary embodiments according to the present invention are explained hereinafter with reference to the drawings. A configuration example of a radio communication system according to a first exemplary embodiment of the present invention is explained with reference to FIG. 1. The radio communication system shown in FIG. 1 includes base stations 10 and 20, and a control device 30.

The base station 10 starts or stops a data transmission process according to the presence/absence of a terminal with which the base station 10 communicates. The base station 10 forms a communication area 110. The base station 10 stops the data transmission process when no terminal 40 is present in the communication area 110, and starts the data transmission process when a terminal 40 is present in the communication area 110. The start of the data transmission process may mean outputting a radio wave to the terminal 40 located in the communication area 110 and the stop of the data transmission process may mean stopping the output of the radio wave.

The communication area of the base station 20 includes a place where a terminal that is affected by interference when a data transmission process is performed in the base station 10 is present. For example, assume that the terminal 40 is communicating with the base station 20 in a communication area where the communication area 110 overlaps a communication area 120. In such a situation, when the base station 10 changes its state from a state in which a data transmission process is stopped to a state in which a data transmission process is started, the terminal 40 is affected by interference caused by a radio wave output from the base station 10. As described above, the communication area 120 formed by the base station 20 includes an area where the communication area 120 overlaps the communication area 110. For example, as shown in FIG. 1, the communication area 120 may include a part of the communication area 110, or may include the entire communication area 110.

The control device 30 controls a start timing of a data transmission process in the base station 10 and transmits information about the start timing of the data transmission process in the base station 10 to the base station 20. The control device 30 may be a computer device that operates as its CPU (Central Processing Unit) executes a program stored in a memory. For example, the control device 30 may be a server device or the like.

The start timing of the data transmission process may be, for example, a time between when the data transmission process is stopped and when the data transmission process is started. Alternatively, the start timing of the data transmission process may be time information.

By using the radio communication system shown in FIG. 1 as explained above, the base station 20 can receive information about the start timing of the data transmission process transmitted from the control device 30. Therefore, the base station 20 can recognize the timing at which the data transmission process is started in the base station 10. As a result, the base station 20 can presume (or expect) that interference will increase due to the start of the data transmission process performed by the base station 10 and the increased interference will cause the deterioration of communication quality in the terminal located in the communication area 120. Therefore, by recognizing that a data transmission process is started in the base station 10, the base station 20 can perform or get ready for performing a process that is performed in preparation for the deterioration of communication quality.

Second Exemplary Embodiment

Figure 2:
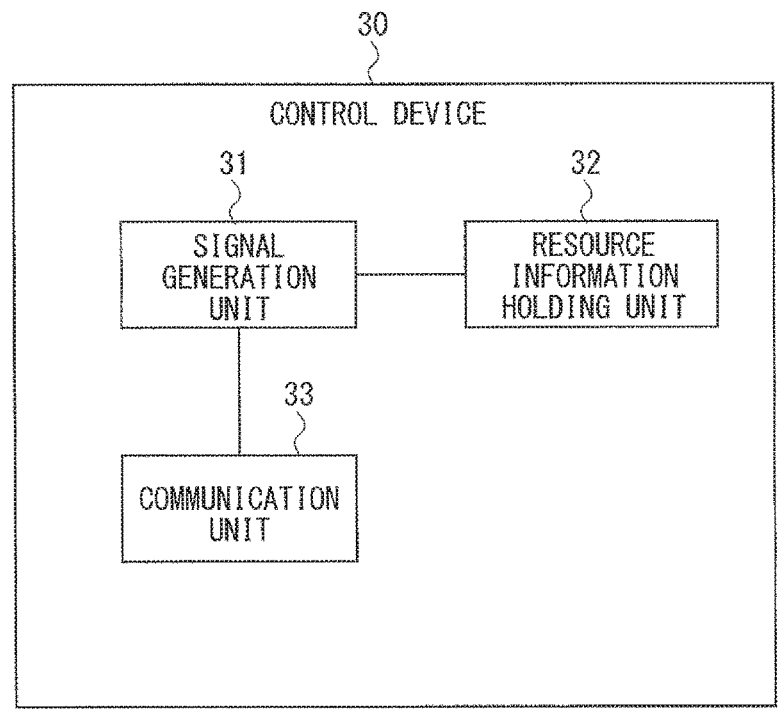
FIG. 2 is a configuration diagram of a control device according to a second exemplary embodiment.

Next, a configuration example of a control device 30 according to a second exemplary embodiment of the present invention is explained with reference to FIG. 2. The control device 30 includes a signal generation unit 31, a resource information holding unit 32, and a communication unit 33. The signal generation unit 31 generates a signal to be transmitted to the base stations 10 and 20. For example, the signal generation unit 31 generates a resource restriction information notification signal that is used to send a notification that the use of a communication resource in the base station 10 is restricted. The communication resource may be, for example, transmission power, a transmission time, or a used frequency in the base station, or a spatial resource for multiplexing signals to be transmitted to a plurality of terminals.

When the communication resource is transmission power, the restriction on the use of the communication resource may be to instruct the base station 10 to use transmission power that is lowered from transmission power used in a regular operation state by several decibels. Further, the resource restriction information notification signal may include information about a period during which the transmission power that is lowered by several decibels is used. That is, the signal generation unit 31 generates a resource restriction information notification signal to notify the base station 10 of information as to how much the transmission power should be lowered from the transmission power used in the regular operation state and a communication resource restriction condition indicating how long the operation in which the transmission power is lowered should be continued.

Further, the signal generation unit 31 generates a resource restriction related information notification signal to notify the base station 20 of a communication resource restriction condition or the like applied in the base station 10. The resource restriction related information notification signal may contain a communication resource restriction condition in the base station 10, a timing at which a communication resource restriction is applied in the base station 10, and an estimated interference increase value in a state where the communication resource is restricted.

The information that is set in the resource restriction information notification signal and the resource restriction related information notification signal by the signal generation unit 31 may be managed in the resource information holding unit 32. The resource information holding unit 32 may be a memory included in the control device 30, a recoding medium device connected to the control device 30, or the like.

The communication unit 33 may be used as a communication interface that is used when the control device 30 communicates with the base station 10 and the base station 20. The communication unit 33 may be connected to the base station 10 through a wired line or through a wireless line. Alternatively, the communication unit 33 may be connected to one of the base stations through a wired line and connected to the other base station through a wireless line.

Figure 3:
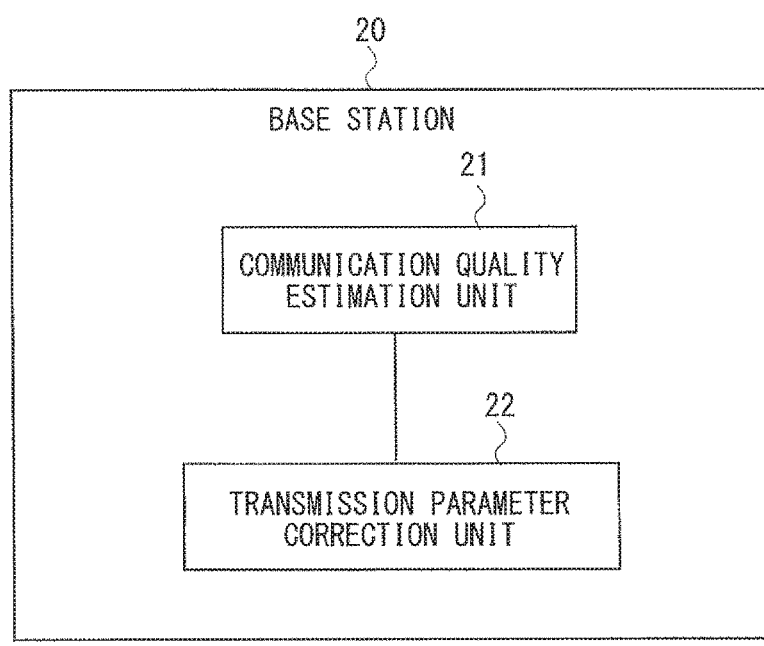
FIG. 3 is a configuration diagram of a base station according to the second exemplary embodiment.

Next, a configuration example of the base station 20 according to the second exemplary embodiment of the present invention is explained with reference to FIG. 3. The base station 20 is a base station that forms a communication area 120 that is affected by interference as a data transmission process is started in the base station 10.

The base station 20 includes a communication quality estimation unit 21 and a transmission parameter correction unit 22. The communication quality estimation unit 21 estimates the quality of communication between the base station 20 and a terminal located in the communication area 120 by using information about an interference level that increases due to a radio wave transmitted from the base station 10. The communication quality may be, for example, an SN (Signal-to-Noise) ratio indicating a ratio between signal power and interference power (hereinafter called a "signal-to-interference power ratio").

The base station 20 transmits data by using a modulation method (or a modulation technique) and an encoding rate associated with communication quality estimated by the communication quality estimation unit 21. For example, communication quality is associated with the modulation method and the encoding rate by using a table shown in FIG. 4 or the like. The modulation method and the encoding rate may be referred to, for example, as "transmission parameters". The CQI index is a numerical value corresponding to the communication quality. For example, it is indicated that the higher the CQI index is, the better the communication quality is. The modulation method is associated with the CQI index. As the value of the CQI index becomes larger, a modulation method with an increased multilevel value is used. The encoding rate is also associated with the CQI index. As the value of the CQI index becomes larger, the encoding rate is increased. However, when the modulation method is changed from QPSK to 16QAM or from 16QAM to 64QAM, the encoding rate is lowered. Then, as the CQI index becomes larger, the encoding rate is increased again. The information bit/symbol indicates an information bit when the specified modulation method and the encoding rate are used.

For example, when the current communication quality is better than the previously-estimated communication quality, the communication quality estimation unit 21 applies a modulation method and an encoding rate associated with a value of the CQI index that is larger than the currently-used value of the CQI index. On the other hand, when the current communication quality is lower than the previously-estimated communication quality, the communication quality estimation unit 21 applies a modulation method and an encoding rate associated with a value of the CQI index that is smaller than the currently-used value of the CQI index.

Figure 5:
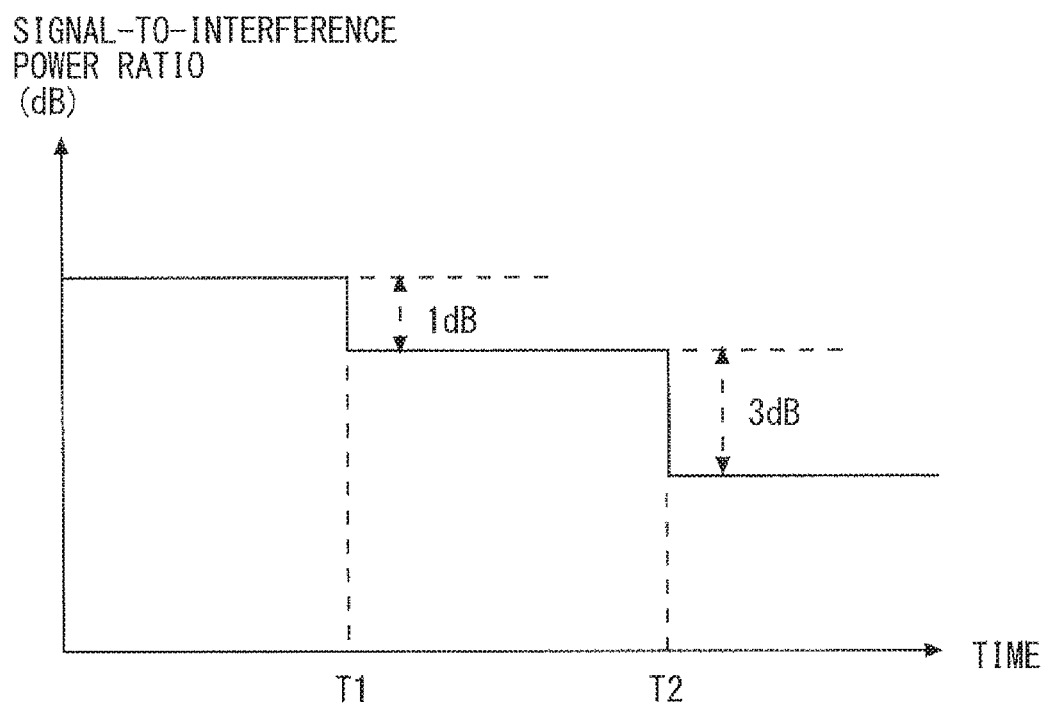
FIG. 5 is a graph for explaining the quality of communication between a base station and a terminal according to the second exemplary embodiment.

The quality of communication between the base station 20 and a terminal in the communication area 120 is explained hereinafter with reference to FIG. 5. FIG. 5 shows communication quality (signal-to-interference power ratio) that changes over time. Assume that the base station 10 starts a data transmission process in a state where its communication resource is restricted at a time T1. For example, assume that the base station 10 starts a data transmission process with transmission power that is lowered from the transmission power used in the regular operation state by 3 dB. Further, assume that an estimated interference increase value that is sent from the control device 30 to the base station 20 in the communication resource restricted sate is 1 dB.

In such a case, the signal-to-interference power ratio in the base station 20 decreases by 1 dB at the time T1. Further, assume that the restriction on the communication resource is lifted (or cancelled) at a time T2. In this case, the base station 10 raises its transmission power by 3 dB. Therefore, the signal-to-interference power ratio in the base station 20 is further lowered by 3 dB. That is, since the interference level on the base station 20 caused by the base station 10 is increased at the times T1 and T2, the communication quality in the base station 20 is lowered.

Referring to FIG. 3 again, as explained above with reference to FIG. 5, the communication quality estimation unit 21 presumes (or estimates) that the communication quality is lowered by 1 dB at the time T1 and further lowered by 3 dB at the time T2. In this case, the communication quality estimation unit 21 may apply, for example, a modulation method and an encoding rate associated with a value of the CQI index immediately below the current value of the CQI index at the time T1. Further, the communication quality estimation unit 21 may apply a modulation method and an encoding rate associated with a value of the CQI index two or three rows below the current value of the CQI index at the time T2.

The relation (or the rule) between decibel values by which the communication quality is lowered and the numbers of rows by which the row in which the value of the CQI index associated with the modulation method and the encoding rate to be applied is recoded is moved down may be determined in advance.

The communication quality estimation unit 21 outputs information about the modulation method and the encoding rate to be applied to the transmission parameter correction unit 22.

The transmission parameter correction unit 22 applies the modulation method and the encoding rate notified (i.e., sent) from the communication quality estimation unit 21 and transmit data to the terminal located in the communication area 120 by using the applied modulation method and the encoding rate. As described above, it is possible to reduce the data error rate by applying a modulation method with a lowered multilevel value, and by increasing redundant bits and thereby lowering the encoding rate at a time at which the communication quality is expected to be lowered.

Figure 6:
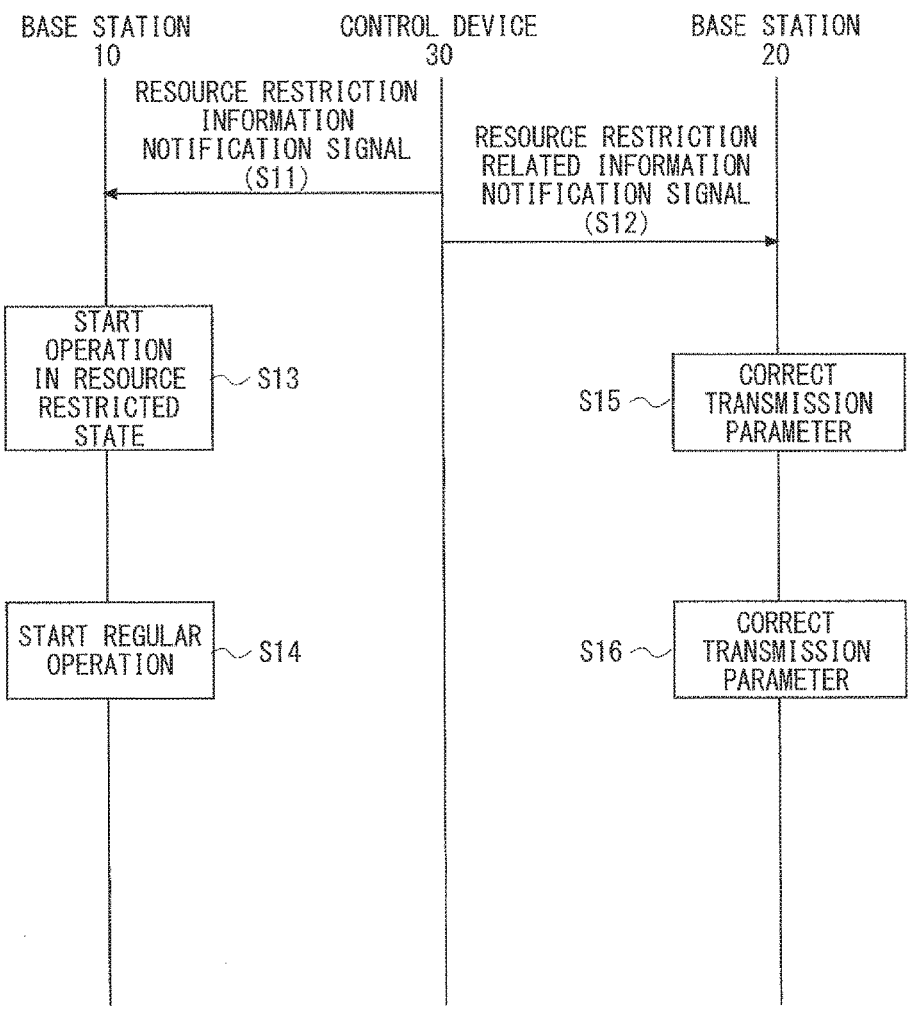
FIG. 6 shows a process flow in a radio communication system according to the second exemplary embodiment.

Next, a process flow in the radio communication system according to the second exemplary embodiment of the present invention is explained with reference to FIG. 6. Firstly, the control device 30 transmits a resource restriction information notification signal to the base station 10 (S11). In the resource restriction information notification signal, information about a communication resource restriction period and a communication resource restriction condition including information about a rate by which transmission power is lowered during the communication resource restriction period are set.

Next, the control device 30 transmits a resource restriction related information notification signal to the base station 20 (S12). In the resource restriction related information notification signal, a communication resource restriction condition in the base station 10, a timing at which a communication resource restriction is applied in the base station 10, and an estimated interference increase value in a state where the communication resource is restricted are set.

Next, the base station 10 starts an operation in a communication resource restricted state in accordance with the communication resource restriction condition set in the resource restriction information notification signal (S13). The communication resource restricted state means starting a data transmission process in a transmission power lowered state. Next, when the communication resource restriction period expires, the base station 10 starts a regular operation (S14). The start of a regular operation means restoring the transmission power, which is in the state where a data transmission process is performed in the transmission power lowered state, to the normal value and performing a data transmission process with the normal transmission power.

When the base station 20 receives the resource restriction related information notification signal in the step S12, the base station 20 corrects transmission parameters based on the estimated interference increase value at a timing at which the communication resource restriction is applied (S15). For example, the correction of transmission parameters means changing the modulation method and the encoding rate to be applied. The timing at which the communication resource restriction is applied may be, for example, immediately before the communication resource restriction is applied. That is, the base station 20 may correct the transmission parameters immediately before the communication resource restriction is applied.

Next, the base station 20 further corrects the transmission parameters based on the communication resource restriction condition at a timing at which the communication resource restriction is lifted (S16). That is, the base station 20 may correct the transmission parameters immediately before the communication resource restriction is lifted.

As explained above, the base station 20 can recognize the timing at which the base station 10 starts a data transmission process by receiving the resource restriction related information notification signal. Further, the base station 20 can estimate an interference increase that is caused when the base station 10 starts a data transmission process. Therefore, the base station 20 can prevent the deterioration of communication quality that would otherwise be caused due to an increase in the interference level by changing the transmission parameters at a timing at which the base station 10 starts a data transmission process.

Third Exemplary Embodiment

Figure 7:
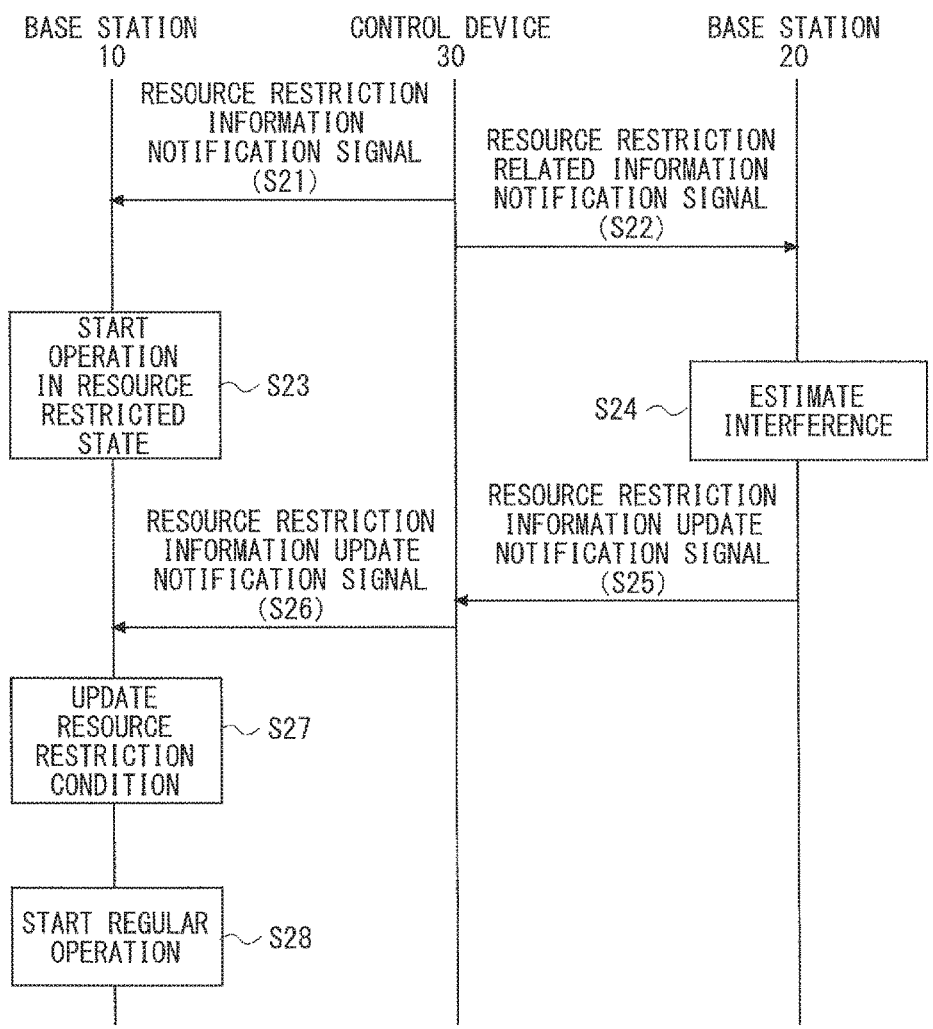
FIG. 7 shows a process flow in a radio communication system according to a third exemplary embodiment.

Next, a process flow in a radio communication system according to a third exemplary embodiment of the present invention is explained with reference to FIG. 7. Firstly, the control device 30 transmits a resource restriction information notification signal to the base station 10 (S21). In the resource restriction information notification signal, information about a communication resource restriction period and a communication resource restriction condition including information about a rate by which transmission power is lowered during the communication resource restriction period are set. For example, assume that the communication resource restriction period is set to 100 ms and information about the rate by which the transmission power is lowered is set to −3 dB.

Next, the control device 30 transmits a resource restriction related information notification signal to the base station 20 (S22). In the resource restriction related information notification signal, at least information about the communication resource restriction period in the base station 10 is set.

Next, the base station 10 starts an operation in a communication resource restricted state in accordance with the communication resource restriction condition set in the resource restriction information notification signal (S23). Further, when the base station 20 receives the resource restriction related information notification signal in the step S22, the base station 20 estimates interference that is caused when the base station 10 starts a data transmission process in a communication resource restricted state (S24). An example of the method for estimating the interference is to use a difference between propagation path quality information that is fed back from the terminal before the communication resource restriction period and propagation path quality information that is fed back from the terminal during the communication resource restriction period. Further, another example method is to have the base station 20 measure the reception power of data transmitted from the base station 10 and estimate the interference by using the value of the measured reception power.

The base station 20 transmits a resource restriction information update notification signal that is generated based on an interference estimation result to the control device 30 (S25). For example, the base station 20 uses first and second thresholds and the interference estimation result when it generates the resource restriction information update notification signal. The value of the second threshold is larger than that of the first threshold.

When an estimated interference level is smaller than the first threshold, the base station 20 transmits a resource restriction information update notification signal in which restriction condition relaxation permission is set to the control device 30. The restriction condition relaxation permission indicates that the communication resource restriction condition in the base station 10 should be relaxed. For example, the communication resource restriction period may be reduced from 100 ms to 50 ms, or the rate by which the transmission power is lowered may be reduced from −3 dB to −2 dB.

When the estimated interference level is not smaller than the first threshold and is smaller than the second threshold, the base station 20 transmits a resource restriction information update notification signal in which restriction condition maintenance is set to the control device 30. The restriction condition maintenance indicates that the current communication resource restriction condition in the base station 10 should be maintained. Alternatively, when the estimated interference level is not smaller than the first threshold and is smaller than the second threshold and hence it is unnecessary to change the current communication resource restriction condition in the base station 10, the base station 20 may not transmit the resource restriction information update notification signal.

When the estimated interference level is not smaller than the second threshold, the base station 20 transmits a resource restriction information update notification signal in which restriction condition enhancement is set to the control device 30. The restriction condition enhancement indicates that the current communication resource restriction condition in the base station 10 should be enhanced. For example, the communication resource restriction period may be increased from 100 ms to 200 ms, or the rate by which the transmission power is lowered may be increased from −3 dB to −5 dB.

For example, assume that the first and second thresholds are 1 dB and 2 dB, respectively. Further, assume that the propagation path quality information in the base station 20 before the base station 10 starts a data transmission process is 10 dB. The propagation path quality information is, for example, an SN ratio. When the propagation path quality information in the base station 20 during the communication resource restriction period is 9.5 dB, the difference is 0.5 dB. Since the difference is smaller than the first threshold, restriction condition relaxation permission is set in the resource restriction information update notification signal.

When the propagation path quality information in the base station 20 during the communication resource restriction period is 8.5 dB, the difference is 1.5 dB. Since the difference is no smaller than the first threshold and smaller than the second threshold, restriction condition maintenance is set in the resource restriction information update notification signal. When the propagation path quality information in the base station 20 during the communication resource restriction period is 7.5 dB, the difference is 2.5 dB. Since the difference is no smaller than the second threshold, restriction condition enhancement is set in the resource restriction information update notification signal.

Upon receiving the resource restriction information update notification signal in the step S25, the control device 30 transmits the received resource restriction information update notification signal to the base station 10 (S26). Upon receiving the resource restriction information update notification signal, the base station 10 checks which of the restriction condition relaxation permission, the restriction condition maintenance, and the restriction condition enhancement is set, and updates the resource restriction condition in accordance with the set information (S27).

Next, when the communication resource restriction period expires, the base station 10 starts a regular operation (S28).

By using the radio communication system according to the third exemplary embodiment of the present invention as explained above, when the base station 20 is notified that a data transmission process is started in the base station 10, the base station 20 can start a process for estimating an interference level caused by the base station 10. Further, the base station 20 can instruct the base station 10 to lower its transmission power or the like according to the interference level estimated in the communication resource restricted state in the base station 10. Therefore, the base station 20 can prevent a sharp increase in the interference level which would otherwise be caused when the base station 10 starts a data transmission process.

Further, although an operation example in which the base station 20 performs interference estimation only once during the communication resource restriction period in the base station 10 is explained above with reference to FIG. 7, the base station 20 may repeatedly perform the interference estimation and repeatedly transmit the resource restriction information update notification signal to the control device 30 during the communication resource restriction period.

Further, when the base station 20 has already received information about the rate by which the transmission power is lowered during the communication resource restriction period in the step S22, the base station 20 can presume (or estimate) an increase in the interference level that will be caused after the expiration of the communication resource restriction period. Therefore, similarly to the operation in the step S16 in FIG. 6, the base station 20 may correct the transmission parameters according to the estimated increase in the interference level when the regular operation is started in the base station 10.

Further, although a process in which the base station 20 generates a resource restriction information update notification signal is explained above with reference to FIG. 7, the base station 20 may transmit the estimated interference level to the control device 30. In this case, the control device 30 may generate the resource restriction information update notification signal by using the interference level transmitted from the base station 20.

Fourth Exemplary Embodiment

Figure 8:
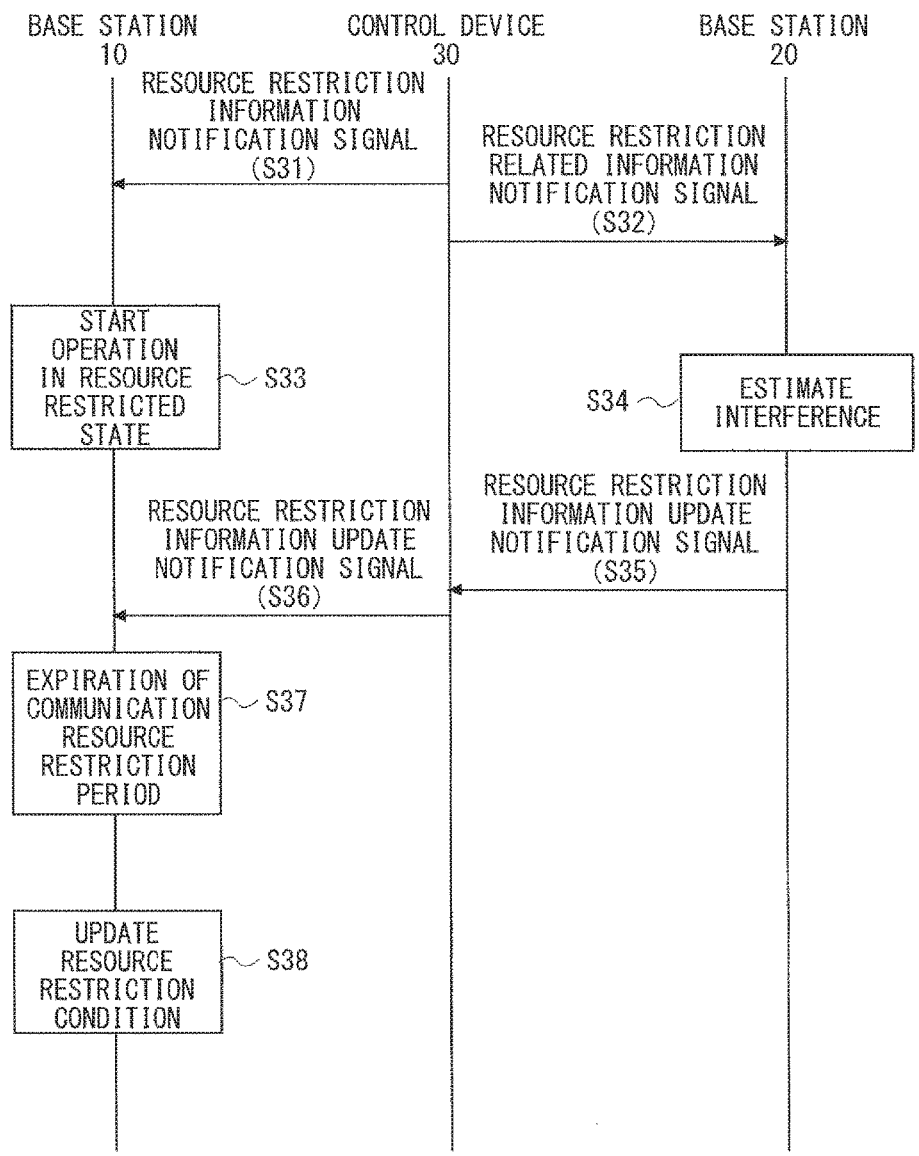
FIG. 8 shows a process flow in a radio communication system according to a fourth exemplary embodiment.

Next, a process flow in a radio communication system according to a fourth exemplary embodiment of the present invention is explained with reference to FIG. 8. Firstly, the control device 30 transmits a resource restriction information notification signal to the base station 10 (S31). In the resource restriction information notification signal, information about a communication resource restriction period and a communication resource restriction condition including information about a rate by which transmission power is lowered during the communication resource restriction period are set. For example, assume that the communication resource restriction period is set to 100 ms and information about the rate by which the transmission power is lowered is set to −3 dB.

Next, the control device 30 transmits a resource restriction related information notification signal to the base station 20 (S32). In the resource restriction related information notification signal, information about a communication resource restriction period in the base station 10 and information about a rate by which the transmission power is lowered is set.

Next, the base station 10 starts an operation in a communication resource restricted state in accordance with the communication resource restriction condition set in the resource restriction information notification signal (S33). Further, when the base station 20 receives the resource restriction related information notification signal in the step S22, the base station 20 estimates interference that is caused after the communication resource restricted state is lifted in the base station 10 (S34). That is, the base station 20 estimates an interference level that is caused due to the 3 dB rise of the transmission power that occurs after the communication resource restricted state is lifted in the base station 10. An example of the method for estimating the interference is to use a difference between propagation path quality information that is fed back from the terminal before the communication resource restriction period and propagation path quality information that is fed back from the terminal during the communication resource restriction period, and the resource restriction condition.

The base station 20 transmits a resource restriction information update notification signal in which the estimated interference level and a restriction condition change value, which is the difference in the permissible interference level, are set to the control device 30 (S35). For example, assume that the permissible interference level is 4 dB and the propagation path quality information before the communication resource restriction period is 10 dB. When the propagation path quality information in the communication resource restriction period is 8.5 dB, the difference in the propagation path quality information between before the communication resource restriction period and after the communication resource restriction period is 1.5 dB. Therefore, the interference level in the communication resource restriction period is estimated to be 1.5 dB. Since the estimated interference level of 1.5 dB is within the permissible interference level of 4 dB, the interference level in the communication resource restriction period is within a permissible range.

However, the transmission power in the base station 10 increases by 3 dB after the expiration of the communication resource restriction period. Therefore, assuming that the interference level in the base station 20 increases by 3 dB after the expiration of the communication resource restriction period, the interference level becomes 4.5 dB after the expiration of the communication resource restriction period. This is because 3 dB is added to the interference level in the communication resource restriction period, which is 1.5 dB. That is, the interference level in the base station 20 is larger than the permissible interference level by 0.5 dB after the expiration of the communication resource restriction period.

Therefore, the base station 20 transmits a resource restriction information update notification signal in which 0.5 dB is set as the restriction condition change value to the control device 30.

The control device 30 transmits the resource restriction information update notification signal received in the step S35 to the base station 10 (S36). After the expiration of the communication resource restriction period (S37), the base station 10 sets a transmission power value based on the restriction condition change value that is notified (i.e., sent) through the resource restriction information update notification signal (S38). That is, the base station 10 performs a data transmission process by using transmission power that is lowered from the transmission power in the regular operation state by 0.5 dB after the expiration of the communication resource restriction period.

By using the radio communication system according to the fourth exemplary embodiment of the present invention as explained above, the base station 20 can determine whether or not the interference level in the base station 10 after the expiration of the communication resource restriction period exceeds the permissible interference level. When the base station 20 determines that the interference level in the base station 10 after the expiration of the communication resource restriction period exceeds the permissible interference level, the base station 20 can instruct the base station 10 to lower its transmission power through the control device 30.

In this way, even after the expiration of the communication resource restriction period, which is set to prevent the interference level from sharply increasing, it is still possible to prevent the interference level in the base station 20 from sharply increasing when the base station 10 starts a data transmission process.

Further, when the interference level in the communication resource restriction period is higher than the permissible interference level in the step S34, the base station 20 may notify the control device 30 of information about a rate by which the transmission power is lowered after the expiration of the communication resource restriction period and information about a rate by which the transmission power is lowered during the communication resource restriction period. In this way, it is possible to lower the interference level to the base station 20 that is caused after the base station 10 starts a data transmission process.

Fifth Exemplary Embodiment

Figure 9:
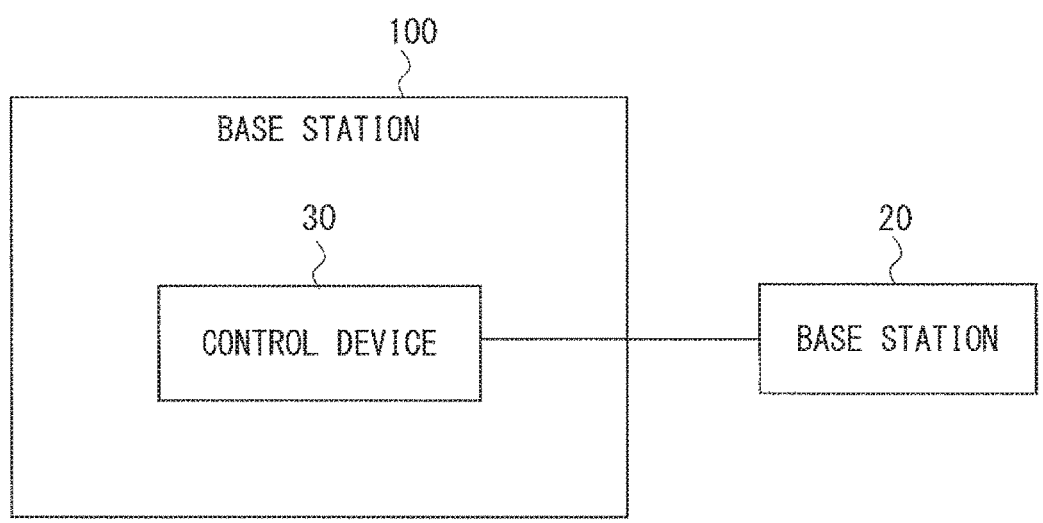
FIG. 9 is a configuration diagram of a radio communication system according to a fifth exemplary embodiment.

Next, a configuration example of a radio communication system according to a fifth exemplary embodiment of the present invention is explained with reference to FIG. 9. In the first to fourth exemplary embodiments, a configuration in which the base stations 10 and 20 connect to the control device 30 is explained. FIG. 9 shows a configuration in which a base station 100 includes a control device 30. The base station 100 is a base station that starts or stops a data transmission process according to the presence/absence of a terminal with which the base station 100 communicates. That is, the base station 100 includes all the functions of the control device 30. In this case, by directly connecting to the base station 20, the base station 100 can notify the base station 20 of the communication resource restriction condition and the like in the base station 100.

Figure 10:
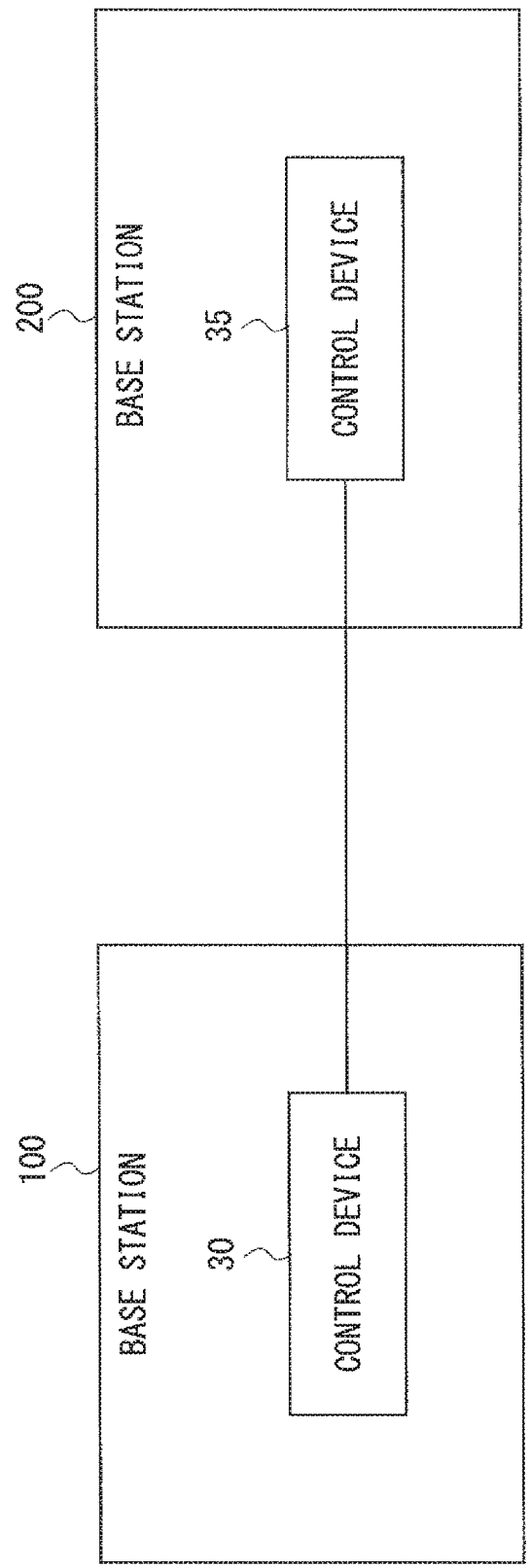
FIG. 10 is a configuration diagram of a radio communication system according to the fifth exemplary embodiment.

Further, as shown in FIG. 10, a base station 200, which connects to the base station 100, may also include a control device 35. As explained above with reference to FIG. 9, the base station 100 is a base station that starts or stops a data transmission process according to the presence/absence of a terminal with which the base station 100 communicates. However, in FIG. 10, the base station 200 may also be a base station that starts or stops a data transmission process according to the presence/absence of a terminal with which the base station 200 communicates. That is, in FIG. 10, each of a plurality of base stations has functions related to the control device. Further, the transmission/reception of a signal between the base station 100 and the base station 200 may be controlled by using any of the control devices.

As explained above, in the radio communication system according to the fifth exemplary embodiment of the present invention, the base station includes the control device or has functions related to the control device. Therefore, it is possible to reduce the number of node devices in the radio communication system and thereby to make the configuration of the radio communication system simpler.

Note that the invention is not limited to the above-described exemplary embodiments and various changes may be made therein without departing from the spirit and scope of the present invention.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2014-161351, filed on Aug. 7, 2014, the disclosure of which is incorporated herein in its entirety by reference.

REFERENCE SIGNS LIST

10 BASE STATION
20 BASE STATION
21 COMMUNICATION QUALITY ESTIMATION UNIT
22 TRANSMISSION PARAMETER CORRECTION UNIT
30 CONTROL DEVICE
31 SIGNAL GENERATION UNIT
32 RESOURCE INFORMATION HOLDING UNIT
33 COMMUNICATION UNIT
35 CONTROL DEVICE
40 TERMINAL
50 TERMINAL
100 BASE STATION
200 BASE STATION
110 COMMUNICATION AREA
120 COMMUNICATION AREA

The invention claimed is:

1. A radio communication system comprising:
a first base station configured to:
start or stop a data transmission process according to presence/absence of a terminal with which the first base station communicates;
a second base station whose communication area includes a place where the terminal is present, the terminal being affected by interference when the data transmission process is performed in the first base station; and
a control device configured to:
control a start timing of the data transmission process in the first base station and transmit information about the start timing of the data transmission process in the first base station to the second base station,
wherein the control device is configured to transmit information about a restriction on a radio resource used in the first base station to the first base station, the information about the restriction on the radio resource including at least one of information about transmission power in a period during which the radio resource used in the first base station is restricted, and information about an interference level estimated in the second base station in the period during which the radio resource used in the first base station is restricted, and
the second base station is configured to change, after the period during which the radio resource is restricted in the first base station is finished, a transmission parameter to be applied by using the information about the transmission power in the period during which the radio resource is restricted in the first base station.

2. The radio communication system according to claim 1, wherein the information about the start timing of the data transmission process includes information about the restriction on the radio resource used in the first base station.

3. The radio communication system according to claim 1, wherein when the second base station receives the information about the start timing of the data transmission process, the second base station is configured to change a transmission parameter by using the information about the interference level, the transmission parameter being applied when data is transmitted.

4. The radio communication system according to claim 3, wherein the transmission parameter includes a modulation method and an encoding rate.

5. A radio communication system comprising:
a first base station configured to:
start or stop a data transmission process according to presence/absence of a terminal with which the first base station communicates;
a second base station whose communication area includes a place where the terminal is present, the terminal being affected by interference when the data transmission process is performed in the first base station; and
a control device configured to:
control a start timing of the data transmission process in the first base station and transmit information about the start timing of the data transmission process in the first base station to the second base station,
wherein the control device is configured to transmit information about a restriction on a radio resource used in the first base station to the first base station, the information about the restriction on the radio resource including at least one of information about transmission power in a period during which the radio resource used in the first base station is restricted, and information about an interference level estimated in the second base station in the period during which the radio resource used in the first base station is restricted, and
when the second base station receives the information about the start timing of the data transmission process, the second base station is configured to estimate the interference level in the period during which the radio resource used in the first base station is restricted, transmit instruction information instructing to relax a restriction on use of the radio resource in the first base station to the control device when the interference level is smaller than a first threshold, and transmit instruction information instructing to enhance the restriction on the use of the radio resource in the first base station to the control device when the interference level exceeds a second threshold larger than the first threshold.

6. The radio communication system according to claim 5, wherein when the control device receives the instruction information transmitted from the second base station, the control device is configured to update information about the restriction on the radio resource to be used and transmit the updated information to the first base station.

7. A radio communication system comprising:
a first base station configured to:
start or stop a data transmission process according to presence/absence of a terminal with which the first base station communicates;
a second base station whose communication area includes a place where the terminal is present, the terminal being affected by interference when the data transmission process is performed in the first base station; and a control device configured to:
control a start timing of the data transmission process in the first base station and transmit information about the start timing of the data transmission process in the first base station to the second base station,
wherein the control device is configured to transmit information about a restriction on a radio resource used in the first base station to the first base station, the information about the restriction on the radio resource including at least one of information about transmission power in a period during which the radio resource used in the first base station is restricted, and information about a first interference level estimated in the second base station in the period during which the radio resource used in the first base station is restricted, and
when the second base station receives the information about the start timing of the data transmission process, the second base station is configured to estimate a second interference level that is caused after the period during which the radio resource used in the first base station is restricted is finished and transmit the estimated interference level to the control device.

8. The radio communication system according to claim 7, wherein the control device is configured to update information about the restriction on the radio resource to be used by using information about the first or second interference level transmitted from the second base station and transmit the updated information about the restriction on the radio resource to be used to the first base station.

9. A control device configured to:
control a first base station configured to start or stop a data transmission process according to presence/absence of a terminal with which the first base station communicates, and a second base station whose communication area includes a place where the terminal is present, the terminal being affected by interference when the data transmission process is performed in the first base station, and control a start timing of the data transmission process in the first base station and transmit information about the start timing of the data transmission process in the first base station to the second base station,
wherein the control device is configured to transmit information about a restriction on a radio resource used in the first base station to the first base station, the information about the restriction on the radio resource including at least one of information about transmission power in a period during which the radio resource used in the first base station is restricted, and information about an interference level estimated in the second base station in the period during which the radio resource used in the first base station is restricted, and
the second base station is configured to change, after the period during which the radio resource is restricted in the first base station is finished, a transmission parameter to be applied by using the information about the transmission power in the period during which the radio resource is restricted in the first base station.

10. An information transmitting method performed in a control device, the control device being configured to control a first base station configured to start or stop a data transmission process according to presence/absence of a terminal with which the first base station communicates, and a second base station whose communication area includes a place where the terminal is present, the terminal being affected by interference when the data transmission process is performed in the first base station, wherein
the information transmitting method comprises controlling a start timing of the data transmission process in the first base station, transmitting information about the start timing of the data transmission process in the first base station to the second base station, and transmitting information about a restriction on a radio resource used in the first base station to the first base station, the information about the restriction on the radio resource including at least one of information about transmission power in a period during which the radio resource used in the first base station is restricted, and information about an interference level estimated in the second base station in the period during which the radio resource used in the first base station is restricted, and
the second base station is configured to change, after the period during which the radio resource is restricted in the first base station is finished, a transmission parameter to be applied by using the information about the transmission power in the period during which the radio resource is restricted in the first base station.

* * * * *